United States Patent
Kalitin et al.

(10) Patent No.: US 10,268,550 B2
(45) Date of Patent: Apr. 23, 2019

(54) VIRTUALIZING A SECURE ACTIVE DIRECTORY ENVIRONMENT

(71) Applicant: Quest Software Inc., Aliso Viejo, CA (US)

(72) Inventors: Sergey Alexandrovich Kalitin, St. Petersburg (RU); Fyodor Aleksandrovich Taranov, St. Petersburg (RU); Sergey Romanovich Vartanov, St. Petersburg (RU)

(73) Assignee: QUEST SOFTWARE INC., Aliso Viejo, CA (US)

( * ) Notice: Subject to any disclaimer, the term of this patent is extended or adjusted under 35 U.S.C. 154(b) by 320 days.

(21) Appl. No.: 15/289,769

(22) Filed: Oct. 10, 2016

(65) Prior Publication Data

US 2018/0101449 A1    Apr. 12, 2018

(51) Int. Cl.
*G06F 11/14* (2006.01)
*G06F 9/455* (2018.01)

(52) U.S. Cl.
CPC ...... *G06F 11/1458* (2013.01); *G06F 9/45558* (2013.01); *G06F 2009/45562* (2013.01); *G06F 2009/45583* (2013.01); *G06F 2009/45587* (2013.01); *G06F 2201/815* (2013.01)

(58) Field of Classification Search
CPC ............. G06F 11/1458; G06F 9/45558; G06F 17/30233; G06F 2009/45562; G06F 2201/815; G06F 2009/45583; G06F 2009/45587
USPC ....................................................... 707/674
See application file for complete search history.

(56) References Cited

U.S. PATENT DOCUMENTS

| | | | |
|---|---|---|---|
| 6,915,309 B1 * | 7/2005 | Conley | .................... H04L 41/12 |
| 8,234,253 B1 * | 7/2012 | Tyurin | ................ G06F 11/1438 |
| | | | 707/675 |
| 8,688,644 B1 * | 4/2014 | Tyurin | ................ G06F 11/1438 |
| | | | 707/675 |

(Continued)

OTHER PUBLICATIONS

Windom et al., "Virtualizing a Windows Active Directory Domain Infrastructure", Copyright 2008, vmware White Paper, 10 pages. (Year: 2008).*

(Continued)

*Primary Examiner* — Phuong Thao Cao
(74) *Attorney, Agent, or Firm* — Kirton McConkie; Brian Tucker (57) ABSTRACT

A recovery solution can employ virtualization software to create a virtualized Active Directory forest from a source Active Directory forest. A recovery agent can be installed on the domain controllers prior to creating copies of the domain controllers in the virtualized forest. Additionally, the recovery agent can be added to a list of trusted applications if the domain controller includes security software. The recovery solution can employ the virtualization software to store a command file at a known directory path. This command file can include commands that should be executed on the virtualized domain controller to configure it properly. The recovery agent can be configured to periodically scan the known directory path to determine whether a command file has been stored in the directory. If the recovery agent locates a command file, it can extract and execute any commands in the command file.

20 Claims, 7 Drawing Sheets

(56) References Cited

U.S. PATENT DOCUMENTS

| | | | | |
|---|---|---|---|---|
| 8,726,277 B2* | 5/2014 | Wells | ............... | G06F 8/63 |
| | | | | 707/610 |
| 8,843,624 B2* | 9/2014 | Britsch | ............... | G06F 9/4401 |
| | | | | 709/201 |
| 9,256,739 B1* | 2/2016 | Roundy | ............... | G06F 21/554 |
| 10,042,657 B1* | 8/2018 | Lauinger | ............... | G06F 9/455 |
| 2005/0114401 A1* | 5/2005 | Conkel | ............... | G06F 11/0709 |
| 2006/0074618 A1* | 4/2006 | Miller | ............... | G06F 9/45504 |
| | | | | 703/13 |
| 2006/0090136 A1* | 4/2006 | Miller | ............... | G06F 9/45504 |
| | | | | 715/734 |
| 2007/0130304 A1* | 6/2007 | Fuller | ............... | H04L 67/1008 |
| | | | | 709/223 |
| 2011/0087874 A1* | 4/2011 | Timashev | ............... | G06F 9/44589 |
| | | | | 713/100 |
| 2013/0191828 A1* | 7/2013 | Wells | ............... | G06F 8/63 |
| | | | | 718/1 |
| 2013/0289926 A1* | 10/2013 | Maity | ............... | G06F 9/45533 |
| | | | | 702/130 |
| 2014/0201736 A1* | 7/2014 | Mizrahi | ............... | G06F 9/45558 |
| | | | | 718/1 |
| 2014/0317293 A1* | 10/2014 | Shatzkamer | ............... | G06F 9/455 |
| | | | | 709/226 |
| 2015/0186172 A1* | 7/2015 | Thomas | ............... | G06F 9/45533 |
| | | | | 718/1 |
| 2015/0261558 A1* | 9/2015 | Robinson | ............... | G06F 9/45558 |
| | | | | 718/1 |
| 2015/0339216 A1* | 11/2015 | Wade | ............... | G06F 11/3688 |
| | | | | 714/38.1 |
| 2015/0358309 A1* | 12/2015 | Edwards, Jr. | ............... | H04L 63/083 |
| | | | | 726/6 |
| 2016/0056975 A1* | 2/2016 | Marin | ............... | H04L 67/10 |
| | | | | 709/220 |
| 2016/0323145 A1* | 11/2016 | Anderson | ............... | H04L 67/1002 |
| 2016/0381031 A1* | 12/2016 | McMichael, IV | ............... | H04L 63/102 |
| | | | | 726/6 |
| 2018/0013636 A1* | 1/2018 | Seetharamaiah | ............... | H04L 41/147 |
| 2018/0101449 A1* | 4/2018 | Kalitin | ............... | G06F 11/1458 |

OTHER PUBLICATIONS

Sean Deuby, "Virtualizing Active Directory", Windows IT Pro, Aug. 2010, vol. 16, Issue 8, pp. 37-40. (Year: 2010).*

EMA Impact Brief, "Quest Recovery Manager for Active Directory Forest Edition", May 2007, 2 pages. (Year: 2007).*

Dell Software, "Recovery Manager for Active Directory Forest Edition", Nov. 2013, 2 pages. (Year: 2013).*

Kline et al., "Investigating the Use of Virtual Servers to Improve the Restoration Process of an Active Directory Forest", MARC07, University of Maryland, Baltimore, Center for Information Technology Services, 2007, 43 pages. (Year: 2007).*

Ned Pyle, "Troubleshooting Windows Server 2012 Virtualized Domain Controller Cloning", Windows IT Pro, Jan. 2013, vol. 19, Issue 1, pp. 27-33. (Year: 2013).*

Microsoft Support, Article 888794, "Things to consider when you host Active Directory domain controllers in virtual hosting environments", Sep. 10, 2011, 4 pages. (Year: 2011).*

Petri, D., "Domain Controller Virtualization Options", Petri IT Knowledgebase, Dec. 31, 2008, 5 pages. (Year: 2008).*

VMware Knowledge Base, KB Article 1006996, "Virtualizing Existing Domain Controllers", Updated Jan. 25, 2011, 5 pages. (Year: 2011).*

* cited by examiner

VIRTUALIZING A SECURE ACTIVE DIRECTORY ENVIRONMENT

CROSS-REFERENCE TO RELATED APPLICATIONS

N/A

BACKGROUND

Dell Recovery Manager for Active Directory Forest Edition is a product that can be employed to recover an Active Directory forest or specific domains in the forest in response to corruption or improper modification to the forest. Recovery Manager can automate the various manual tasks involved in a recovery, remotely quarantine corrupt domain controllers, and restore domain controllers to speed up the overall recovery and restore business operation quickly.

The process of recovering an Active Directory forest can be extremely complicated. For example, Microsoft outlines over a dozen steps just to get a domain controller up and running. These steps include quarantining domains, seizing operations master roles, metadata cleanup, DNS configuration, and resetting many Active Directory account passwords, among many others that must be performed on each domain controller in the forest. If these steps are performed incorrectly or out of order, the recovery process may need to be restarted from the beginning.

Recovery Manager facilitates this recovery process by automating the various steps thereby ensuring that they are completed correctly and in order. To employ Recovery Manager or other Active Directory recovery solutions, it is necessary to prepare a "disaster recovery plan" which defines the steps that the recovery solution should perform. Creating this disaster recovery plan can be a difficult process. Also, once the disaster recovery plan is created, it can be difficult to know whether it will be effective once recovery is necessary.

To address the concern of not knowing whether a disaster recovery plan will be effective, Dell has developed a tool, known as Active Directory Virtual Lab, which can be employed to create a virtual test environment in which the disaster recovery plan can be tested. The virtual test environment can be created from an entity's Active Directory forest by configuring virtual machines to emulate the forest or a portion of the forest. For example, a virtual machine could be created in the virtual test environment for each physical or virtual domain controller or standalone server in the forest. These virtual machines can be configured with the same settings as the corresponding domain controller or standalone server such as by specifying general settings (e.g., host name and access credentials), hardware settings (e.g., number of processors, the amount of memory, network settings (including those to isolate the virtual test environment from the source environment), and disk volumes), Active Directory settings (e.g., which FSMO roles the virtual machine will perform and whether the virtual machine will act as a Global Catalog server), etc. These settings could be automatically identified from the source forest and/or could be manually specified by the administrator.

Figure 1:
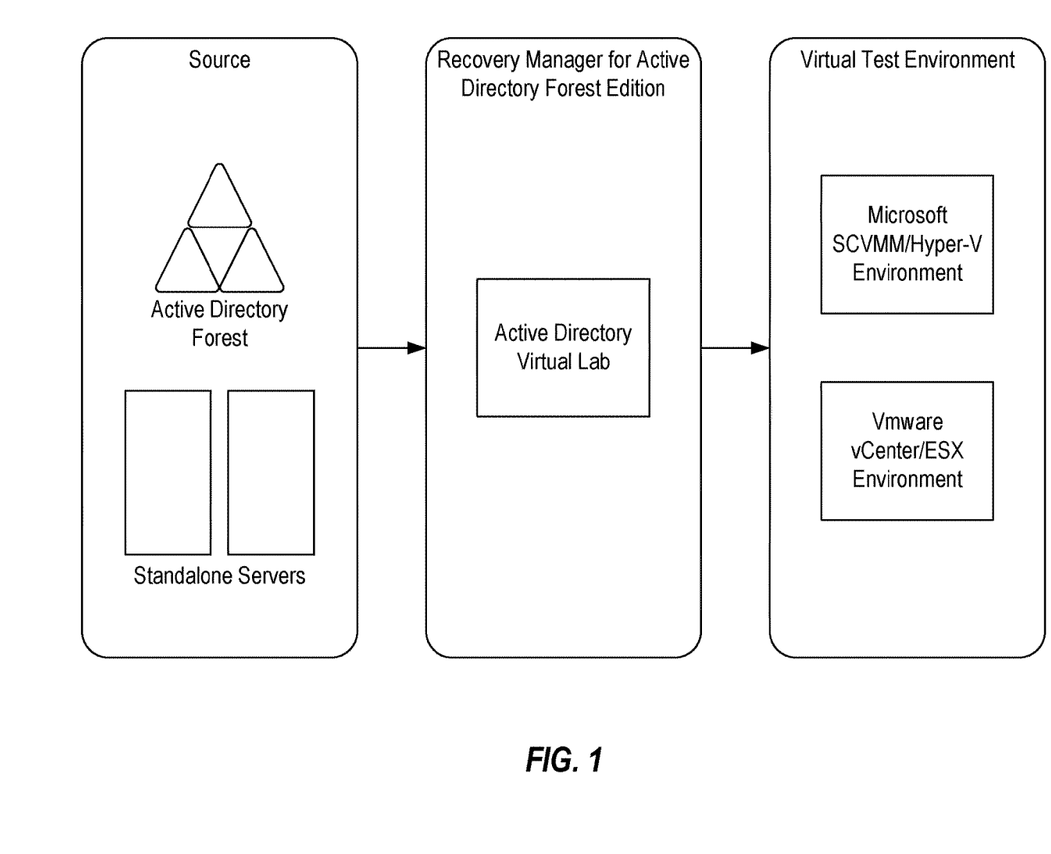
FIG. 1 provides an overview of how a recovery solution can be employed to create a virtualized Active Directory forest from a source Active Directory forest.

To create these virtual machines, the recovery solution typically employs third-party virtualization software such as Microsoft System Center Virtual Machine Manager (SCVMM), VMware ESX, or VMware vCenter. FIG. 1 illustrates an example of this type of environment. As shown, the recovery solution can employ third-party virtualization software to create a virtual test environment based on a source environment. Because third-party virtualization software is employed, the recovery solution is limited to using the native tools of the third-party virtualization software to create and manage the virtual machines. As such, the recovery solution will be limited in how it can configure the virtual machines.

In some situations, the recovery solution may be able to configure a virtual machine using a batch file. The batch file could include instructions which when executed on the virtual machine will configure many of the various settings mentioned above. In these cases, the recovery solution can employ the native tools (or APIs) of the third-party virtualization software to transfer the batch file to the virtual machine and then invoke it.

In other situations, however, the recovery solution may not be able to employ a batch file. For example, because the domain controllers that are created in the virtual test environment will be exact copies of the domain controllers in the source environment, the target domain controller will include all software that was installed on the corresponding source domain controller. If the source domain controller includes security software (e.g., anti-virus software), the security software, which will also be installed on the target domain controller, may prevent the execution of batch files. If batch file execution is not available, the third-party virtualization software may not provide another viable option for configuring the target domain controller.

BRIEF SUMMARY

The present invention extends to methods, systems, and computer program products for configuring a virtualized Active Directory forest. A recovery solution can employ virtualization software to create a virtualized Active Directory forest from a source Active Directory forest. A recovery agent can be installed on the domain controllers prior to creating copies of the domain controllers in the virtualized forest. Additionally, if security software is installed on a domain controller, the recovery agent can be added to a list of applications that are trusted by the security software.

When the virtualized forest is created, the virtualized domain controllers will include all software that was installed on the domain controllers in the source forest and will therefore include the recovery agent as well as the security software. To configure the virtualized domain controllers, the recovery solution can employ the virtualization software to store a command file at a known directory path. This command file can include any commands that should be executed on the virtualized domain controller to configure it properly. The recovery agent can be configured to periodically scan the known directory path to determine whether a command file has been stored in the directory. If the recovery agent locates a command file, it can extract and execute any commands in the command file. Because the recovery agent is a trusted application, the security software will allow it to execute the commands.

In one embodiment, the present invention is implemented by a recovery solution as a method for configuring a virtual machine to function as a virtualized domain controller in a virtualized Active Directory forest. Prior to creating a virtualized Active Directory forest that represents a source Active Directory forest, the recovery solution can install a recovery agent on a source domain controller in the source Active Directory forest. The recovery agent can be configured to scan a known directory path for command files and to execute any commands defined in the command files. The recovery solution can then employ virtualization software to create the virtualized Active Directory forest that includes a virtualized domain controller that is a copy of the source domain controller such that the virtualized domain controller includes the recovery agent. The recovery solution may also create a command file that includes one or more commands for configuring the virtualized domain controller and employ the virtualization software to upload the command file to the known directory path on the virtualized domain controller. This will cause the recovery agent to identify the command file and execute the one or more commands to thereby configure the virtualized domain controller.

In another embodiment, the present invention is implemented as computer storage media storing computer executable instructions which implement a system for creating a virtualized Active Directory forest from a source Active Directory forest. This system can include a recovery agent that is configured to be executed on a domain controller including to scan a known directory path for command files and to execute any command defined in the command files. The system may also include a recovery solution that is configured to: install the recovery agent on source domain controllers in the source Active Directory forest; employ virtualization software to create virtualized domain controllers in the virtualized Active Directory forest to represent the source domain controllers, the virtualized domain controllers being copies of the source domain controllers such that the recovery agent is installed on the virtualized domain controllers; create a command file for each virtualized domain controller, each command file including one or more commands for configuring the corresponding virtualized domain controller; and employ the virtualization software to upload each command file to the known directory path on the corresponding virtualized domain controller. Upon detecting the command file that has been uploaded to the known directory path on the corresponding virtualized domain controller, the recovery agent executes each of the one or more commands to configure the corresponding virtualized domain controller.

In another embodiment, the present invention is implemented as a method for configuring a virtualized domain controller. A recovery solution can install a recovery agent on a source domain controller in a source Active Directory forest. The recovery solution can then instruct virtualization software to create a virtualized domain controller as a copy of the source domain controller such that the virtualized domain controller includes the recovery agent. The recovery solution may then upload a command file to a known directory path on the virtualized domain controller. This command file can include one or more commands for configuring the virtualized domain controller. The recovery agent periodically scans the known directory path. Upon detecting the command file in the known directory path, the recovery agent executes each of the one or more commands.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

The present invention is specifically directed to Active Directory environments. Since one of skill in the art will understand the various components of an Active Directory environment, a detailed discussion of these components will not be provided herein. As is known, a domain controller is a server on which Active Directory Domain Services (AD DS) is installed. A domain controller is part of a domain (or collection of computers and resources that share a common security database) and stores a master copy of the domain's user account and security database. A domain tree is a grouping of one or more domains, and a forest is a grouping of one or more domain trees.

Of primary importance to the present invention is the fact that an Active Directory forest, which will always include at least one domain controller, can be virtualized by creating virtual copies of at least a subset of the domain controllers in the forest. The present invention is primarily directed to techniques that can be employed to allow a domain controller in a virtualized Active Directory forest to be configured as a replica of a domain controller in a source Active Directory even when security software on the domain controller may prevent a batch file from being executed.

Figure 2:
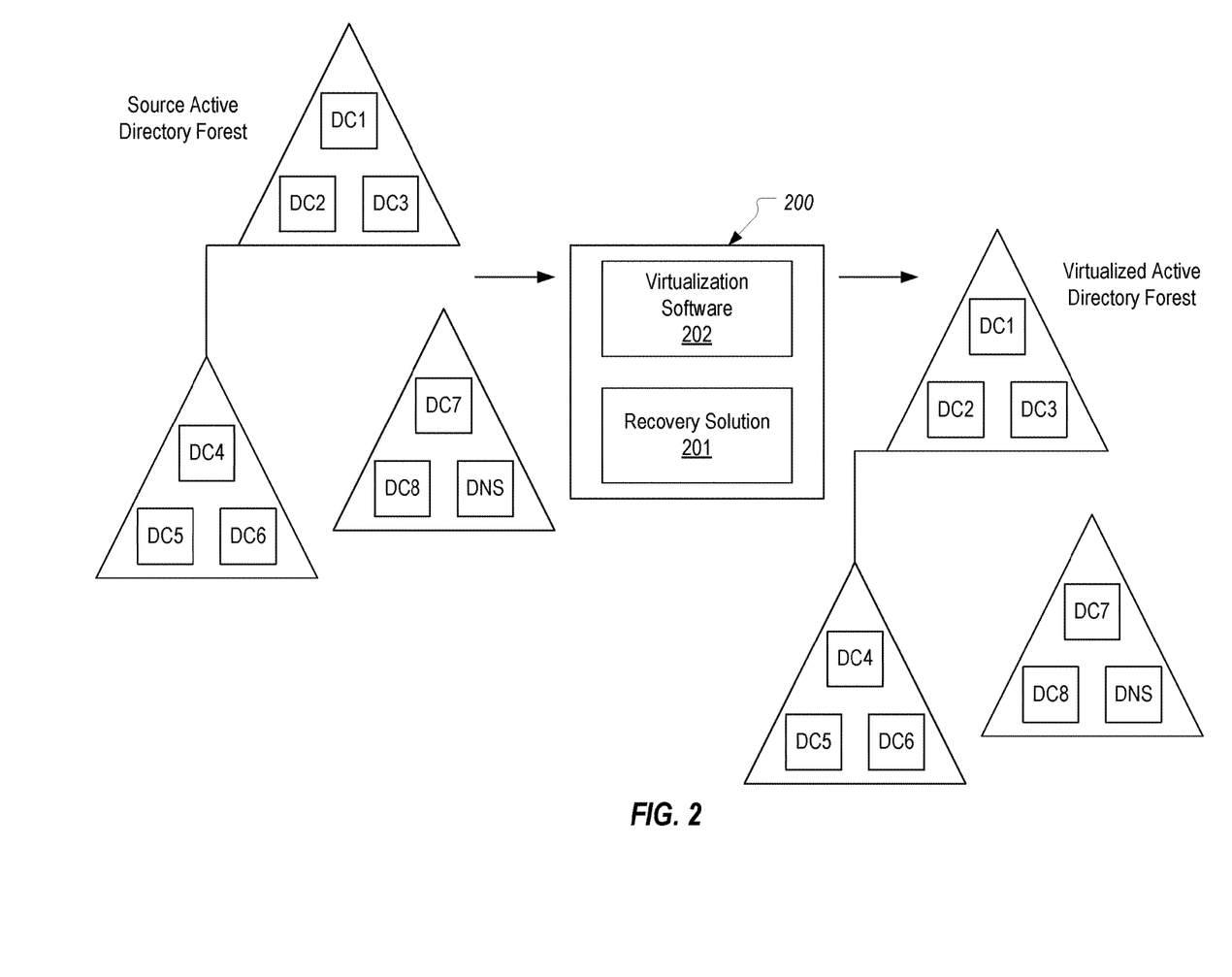
FIG. 2 generally illustrates the components that can be involved in creating a virtualized Active Directory forest including a recovery solution and virtualization software.

FIG. 2 provides an example of how a recovery solution 201 can employ virtualization software 202 to create a virtualized Active Directory forest from a source Active Directory forest. As mentioned in the background, one non-limiting example of recovery solution 201 is Dell's Recovery Manager for Active Directory Forest Edition which includes the Active Directory Virtual Lab, and non-limiting examples of virtualization software 202 include Microsoft System Center Virtual Machine Manager (SCVMM), VMware ESX, or VMware vCenter. Of course, recovery solution 201 can represent any component capable of employing any virtualization software to create a virtualized Active Directory forest regardless of whether the recovery solution may also be capable of implementing a recovery of an Active Directory forest. The term "recovery solution" should therefore be construed as a component that manages the creation of a virtualized Active Directory forest.

In FIG. 2, the source Active Directory forest is depicted as including three domains each of which includes a number of domain controllers and one of which includes a DNS server. These domain controllers and the DNS server may either be physical or virtual machines. The FSMO roles may be assigned to one domain controller in each domain or may be distributed among multiple domain controllers in the domain. Also, one or all of the domain controllers in the forest may be a Global Catalog server. As is known, virtually limitless architectures could be employed in a particular forest and therefore the present invention should not be limited to any particular forest architecture.

In FIG. 2, recovery solution 201 and virtualization software 202 are shown as being executed on a server 200. Server 200 could be any computing device within the source Active Directory forest or that otherwise has access to the source Active Directory forest. As was addressed in the background, recovery solution 201 can employ virtualization software 202 to create the virtualized Active Directory forest. For example, recovery solution 201 can provide appropriate inputs and invoke appropriate functions of virtualization software 202 to cause virtualization software 202 to create a virtual machine for each domain controller and the DNS server in the source Active Directory forest and to customize the virtual machines so that they are an essentially exact copy of the corresponding server in the source forest. "Essentially exact" refers to the fact that the network settings of the virtualized domain controllers should be configured so that the virtualized Active Directory forest is isolated from the source Active Directory forest (e.g., by isolating the virtualized Active Directory forest on a different network). "Essentially exact" also refers to cases where not all of the domain controllers will be copied into the virtualized Active Directory forest. In these cases, the FSMO roles may need to be reassigned to the domain controllers that were copied so that all roles are provided within a domain.

By way of example only, recovery solution 201 can employ virtualization software 202 to automate a number of steps to get the virtual machines in the virtualized environment up and running including: creating a VSS disk snapshot of each machine in the source system (whether physical or virtual); deploying the snapshot to virtual machines in the virtualized environment; updating boot sectors and the boot.ini on each virtual machine; updating drive letters for each virtual machine's volume layout; processing the reconfiguration datastore; scheduling the installation of tools on each virtual machine to allow virtualization software 202 to manage the virtual machines; powering on the virtual machine; etc.

After these steps have been performed, and the virtual machines are running, recovery solution 201 can employ virtualization software 202 to perform a number of additional steps to configure the virtual machines to be copies of the corresponding domain controllers in the source forest as well as to isolate the virtualized forest from the source forest. These additional steps include: applying network settings by adding necessary adapters to the virtual machines (if necessary), setting IP addresses, gateway masks, default gateway, DNS server, etc. to create the network in the virtualized environment; resetting passwords for the virtual machine domain accounts to add a level of isolation from the source environment; assigning Global Catalog roles to the virtualized domain controllers; seizing FSMO roles and configuring the FSMO roles for the domain controllers in the virtualized forest; restarting the virtual machines after the FSMO roles and Global Catalog roles are applied; setting network parameters on the virtual machines; enabling network adapters; etc.

As was addressed in the background, these additional steps can be performed by executing a batch file on each virtual machine. However, this may not be possible in some environments such as when the domain controllers in the source Active Directory forest include security software that prohibits the execution of batch files. The present invention provides an alternate technique for performing these additional steps in any Active Directory environment, but more particularly in an Active Directory environment where security software is installed on the domain controllers.

Figure 3:
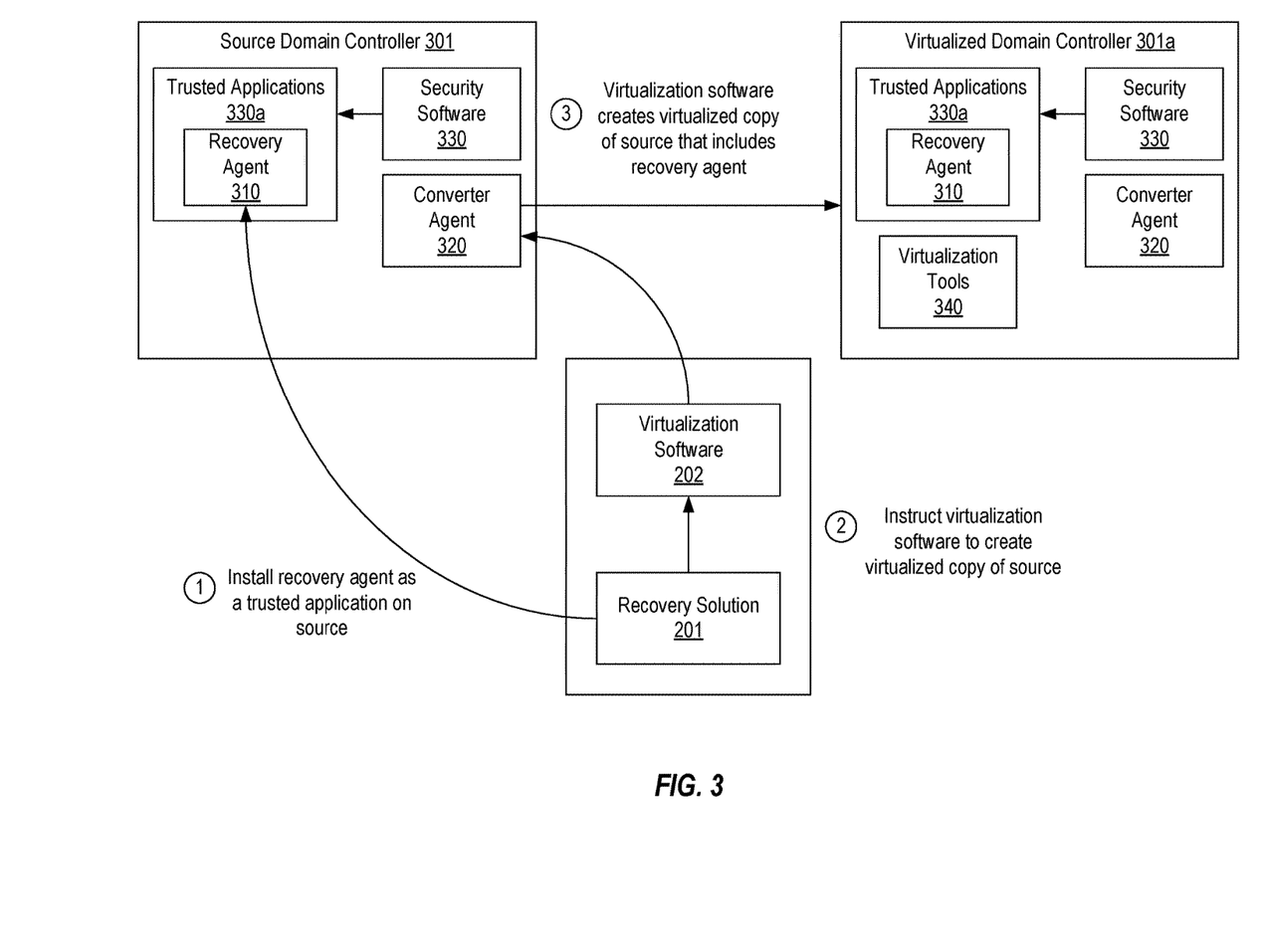
FIG. 3 illustrates how the recovery solution can prepare a domain controller prior to creating a virtualized copy of the domain controller.

FIG. 3 provides a more detailed example of how a virtualized domain controller 301a can be created from a source domain controller 301 in accordance with embodiments of the present invention. Source domain controller 301 can represent any of the domain controllers depicted in FIG. 2. It is assumed that security software 330 and a converter agent 320 will have been installed on source domain controller 301. Converter agent 320 can be a component of, or otherwise be configured to interact with, virtualization software 202 to enable virtualization software 202 to create a virtualized copy of source domain controller 301 as is known in the art.

As represented by step 1 in FIG. 3, prior to initiating the process of creating virtualized domain controller 301a from domain controller 301, recovery solution 201 can install a recovery agent 310 on domain controller 301. As part of installing recovery agent 310, recovery solution 201 can also add recovery agent 310 to a list 330a of applications that are trusted by security software 330. This same step can be performed on each domain controller in the source forest for which a virtualized copy will be created in the virtualized forest.

By installing recovery agent 310 on each source domain controller to be copied and by registering recovery agent 310 as a trusted application prior to the creation of the virtualized forest, recovery solution 201 can ensure that recovery agent 310 will be installed as a trusted application on the virtualized domain controllers that will be created in the virtualized forest. For example, as shown as step 2 in FIG. 3, recovery solution 201 can instruct virtualization software 202 to create virtualized domain controller 301a. In response, as represented by step 3, virtualization software 202 and converter agent 320 will work in tandem to create a virtual machine for virtualized domain controller 301a which will represent source domain controller 301 in the virtualized Active Directory forest. Steps 2 and 3 in FIG. 3 can encompass the above-described steps that are performed to get a virtual machine up and running including the step of installing virtualization tools 340 (e.g., VMWare Tools). Virtualization tools 340 can represent a component of virtualization software 202 that is installed on a virtual machine to allow virtualization software 202 to configure the virtual machine.

The process depicted in FIG. 3 can be performed for each domain controller in the source forest for which a virtualized domain controller will be created in the virtualized forest. Accordingly, after this process has been performed, a number of virtual machines will have been created in the virtualized environment to represent the specified domain controllers in the source forest. At this point it will be necessary to employ the available functionality of virtualization software (e.g., APIs) to further configure each virtual machine to create the virtualized Active Directory forest.

Figure 4A:
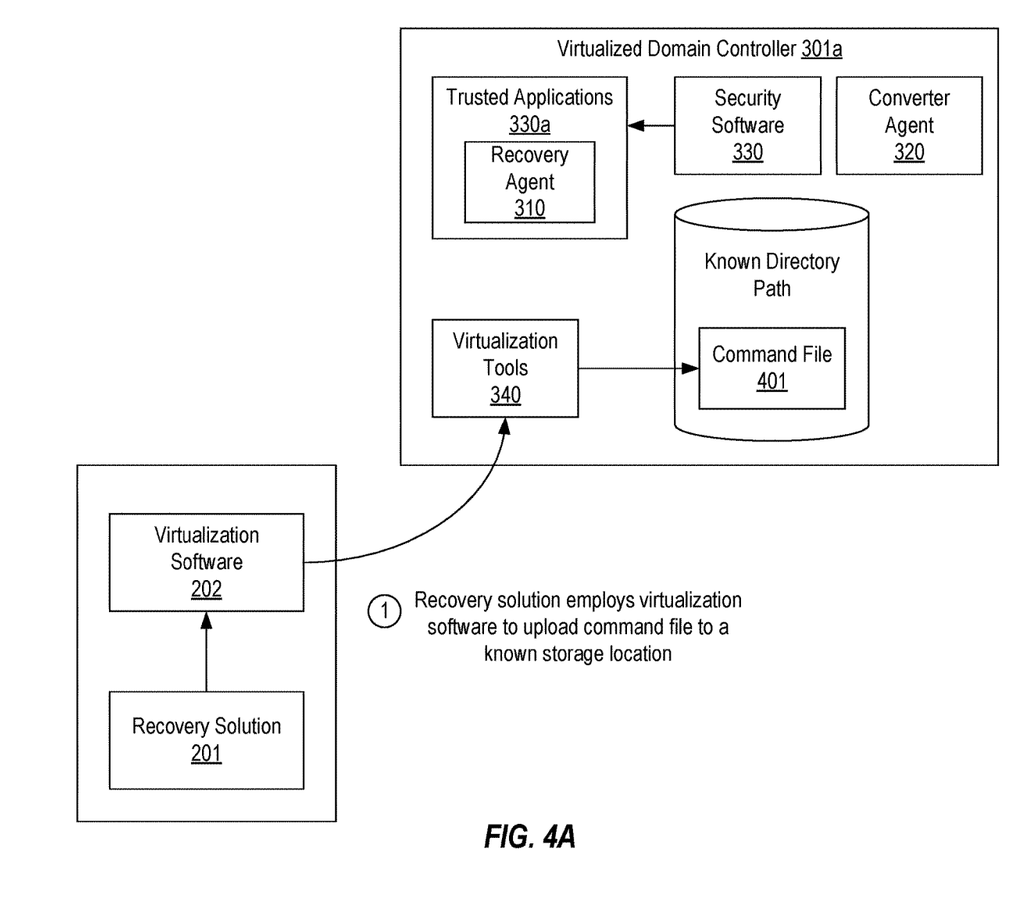
FIG. 4A illustrates how the recovery solution delivers a command file to a virtualized domain controller.
Figure 4B:
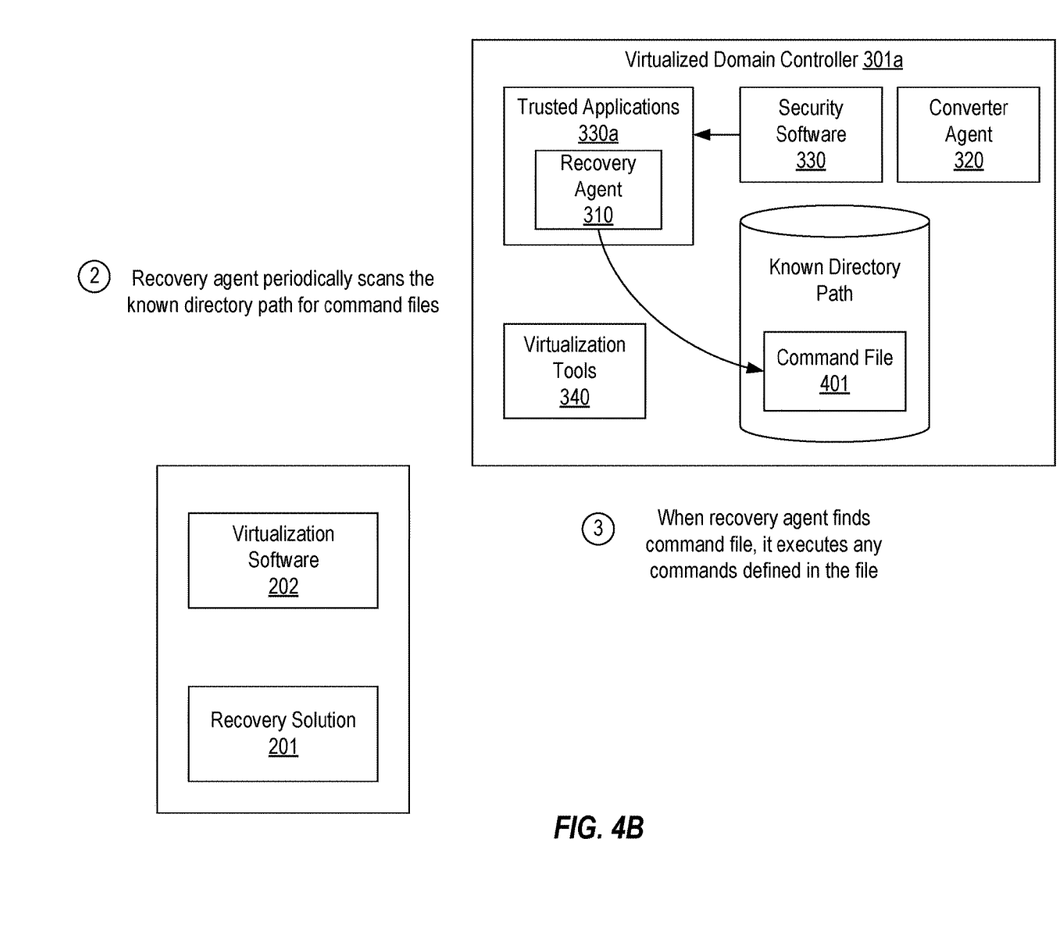
FIG. 4B illustrates how a recovery agent on the virtualized domain controller can access the command file to extract and execute commands for configuring the virtualized domain controller.

FIGS. 4A and 4B illustrate how this further configuration can be performed without employing a batch file. As mentioned above, virtualization software 202 can interface with virtualization tools 340 to configure virtualized domain controller 301a (or more accurately, to configure the virtual machine that will function as virtualized domain controller 301a). Virtualization software 202 may provide limited options by which recovery solution 201 can invoke the functionality of virtualization tools 340. The present invention exploits these limited options to configure a virtual machine to function as a virtualized domain controller without using a batch file.

Recovery agent 310, which was installed on source domain controller 301 and will therefore be installed on virtualized domain controller 301a, can be configured to periodically scan a known directory path to determine whether a command file has been stored in the directory. When recovery agent 310 detects a command file in the directory, it can extract and execute any commands that are included in the command file. Because recovery agent 310 is included in list 330a of trusted applications, security software 330 will not prevent recovery agent 310 from executing these commands.

Accordingly, recovery solution 201 can create a command file that includes appropriate commands for configuring virtualized domain controller 301a. For example, as represented by step 1 in FIG. 4A, recovery solution 201 can use the available APIs to upload command file 401 to a known directory path on virtualized domain controller 301a (i.e., to the directory path that recovery agent 310 is configured to monitor). Command file 401 can include commands that when executed will cause virtualized domain controller 301a to function as an exact copy of source domain controller 301. For example, command file 401 can include commands for applying network settings, resetting passwords, assigning the Global Catalog role, assigning FSMO roles, etc. Of course, in scenarios where less than all of the domain controllers in the source forest will be copied to the virtualized forest, commands may be provided to assign roles to a virtualized domain controller that its corresponding source domain controller was not assigned and therefore the commands may cause a domain controller to be an "essentially exact" copy.

Turning to FIG. 4B, recovery agent 310 will periodically scan the known directory path to determine whether a command file has been stored there as represented by step 2. In some embodiments, the known directory path could be a unique directory path in which only command files would be stored. In such cases, recovery agent 310 can treat any file stored in the directory as a command file. In contrast, in other embodiments, the known directory path could be any directory path where other files may also be stored. In such cases, recovery solution 201 may be configured to include some criteria for identifying a file as a command file to recovery agent 310. For example, a unique naming convention or header could be employed with command files.

Finally, whenever recovery agent 310 finds a command file in the known directory path (e.g., upon finding command file 401 stored in the known directory path), it can process the command file by executing each command contained therein as represented by step 3. For example, command file 401 could be a text file that includes one or more commands that are separated by the newline character or another delineator. In such cases, recovery agent 310 could parse command file 401 to extract each command and then execute each command via a command prompt or other suitable technique.

In some embodiments, recovery agent 310 could be configured to delete a command file after it has executed each command in the file. Alternatively, recovery agent 310 could store an indication of each command file that it has processed and use such indications to ensure that the same command file is not processed more than once. In some embodiments, recovery solution 201 could be configured to upload a single command file that includes all commands that need to be executed to configure the virtualized domain controller, while in other embodiments, recovery solution 201 could upload multiple command files in which these commands are distributed. Also, if subsequent updates need to be made to the configuration of the virtualized domain controller 301a (e.g., to change a network setting or role performed by the domain controller), recovery solution 201 could accomplish this by uploading another command file containing appropriate commands. In short, because recovery agent 310 will be periodically scanning the known directory path, recovery solution 201 will only need to upload a command file to that path to configure the virtualized domain controller.

In some embodiments, any subsequently uploaded command file could overwrite an existing command file. In such cases, recovery agent 310 could detect when modifications to the command file stored in the known directory path have been made and can then execute any commands contained in the modified command file. In this way, recovery agent 310 could employ the modification date of a command file to determine when new commands have been uploaded.

Figure 5:
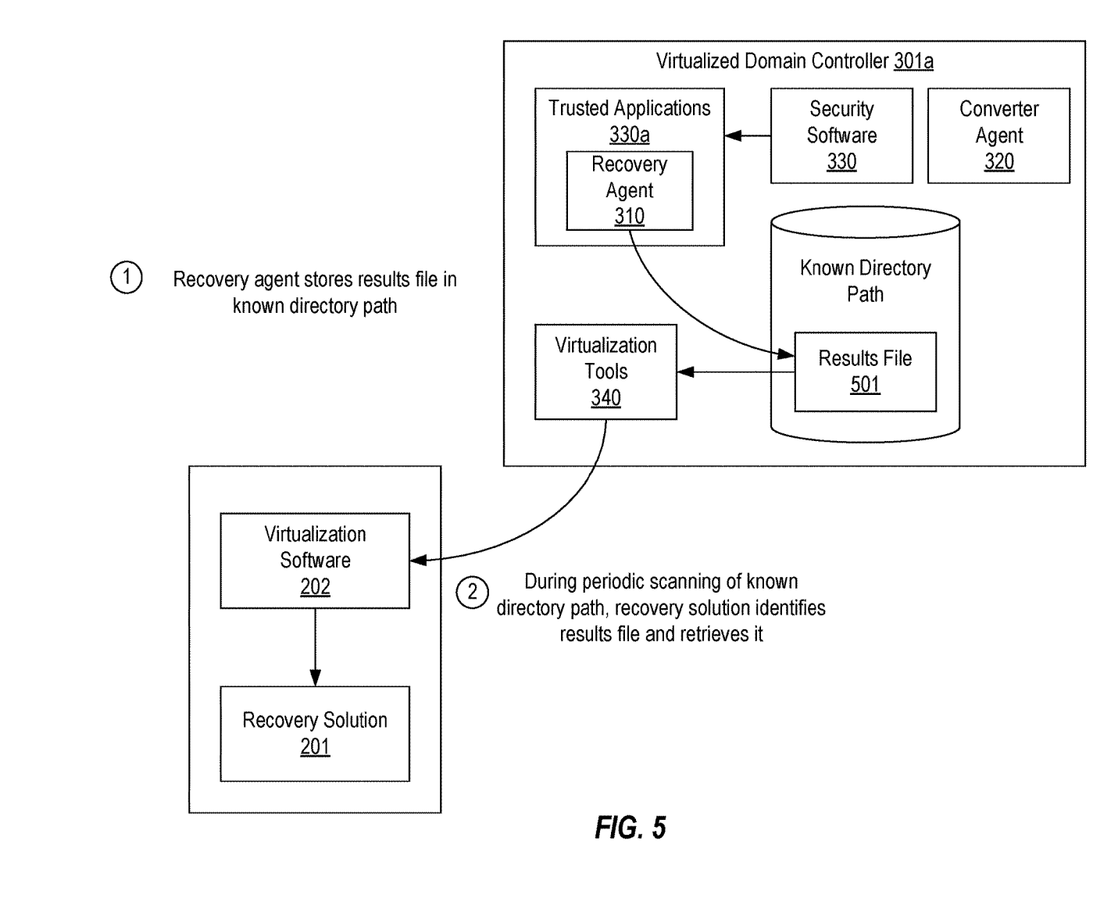
FIG. 5 illustrates how the recovery agent can deliver a results file to the recovery solution.

Recovery agent 310 can also be configured to communicate the results of executing the commands in a similar manner. This process is essentially the reverse of the above described process and is generally depicted in FIG. 5. As shown in step 1, recovery agent 310 can create a results file and store the results file in the known directory path after it has executed the command(s) in command file 401. Recovery solution 201, via virtualization tools 340, can be configured to periodically scan the known directory path to identify when a results file has been stored/updated. Accordingly, recovery solution 201 will identify results file 501 in the known directory path and can retrieve it in step 2.

Recovery agent 310 can employ an suitable technique to identify a file as a results file. For example, a results file could employ a unique naming scheme, header, or other identifier to distinguish a results file from a command file. In this way, the same directory path could be employed for each type of file. In contrast, in other embodiments, one known directory path may be employed for command files and another known directory path may be employed for results files. In such cases, the presence of a file in the particular directory path will identify it as either a command file or a results file.

Although this technique has been described with reference to domain controllers, the same technique could be employed to configure any virtualized system such as, for example, a virtualized DNS server. Recovery solution 201 therefore provides a simple yet effective way to configure a virtual machine for a particular purpose in a virtualized forest.

Figure 6:
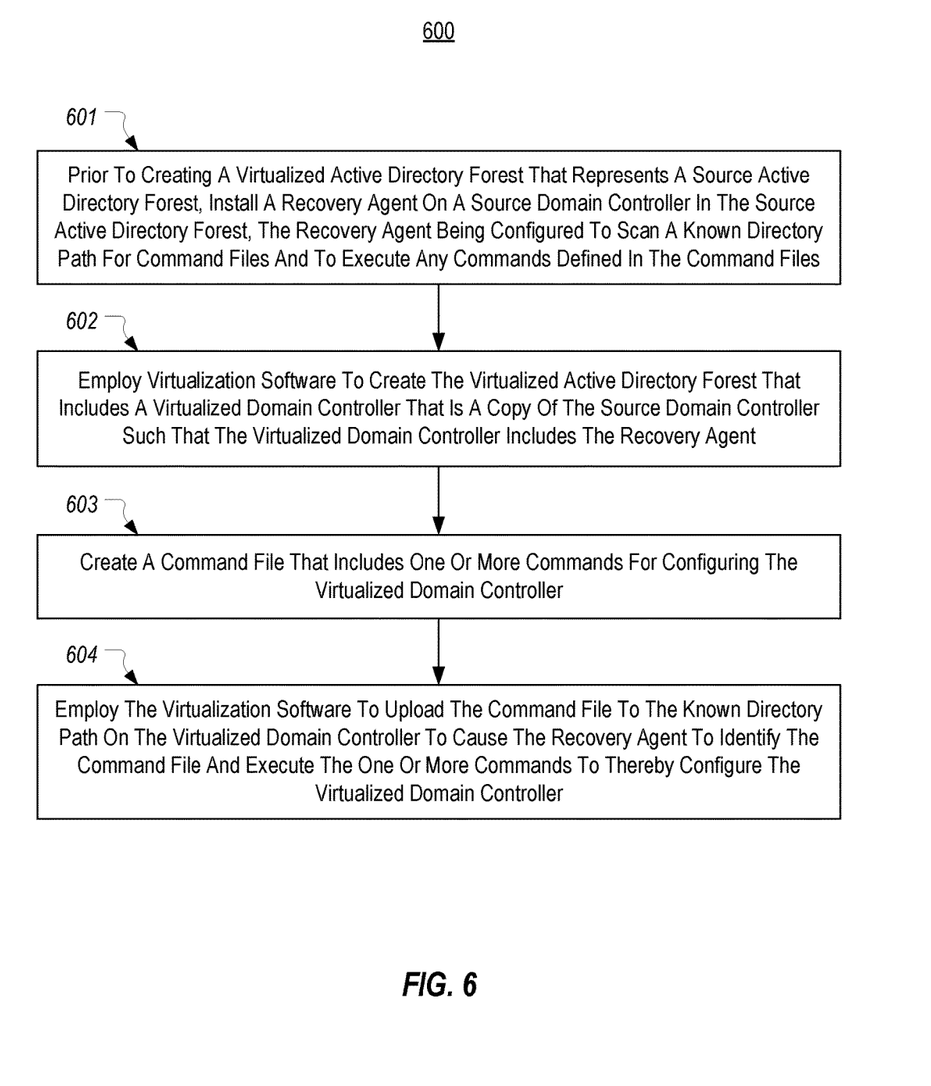
FIG. 6 illustrates a flowchart of a method for configuring a virtual machine to function as a virtualized domain controller in a virtualized Active Directory forest.

FIG. 6 illustrates a flowchart of an example method 600 for configuring a virtual machine to function as a virtualized domain controller in a virtualized Active Directory forest. Method 600 will be described with reference to the figures.

Method 600 includes an act 601 of, prior to creating a virtualized Active Directory forest that represents a source Active Directory forest, installing a recovery agent on a source domain controller in the source Active Directory forest, the recovery agent being configured to scan a known directory path for command files and to execute any commands defined in the command files. For example, recovery solution 201 can install recovery agent 310 on source domain controller 301.

Method 600 includes an act 602 of employing virtualization software to create the virtualized Active Directory forest that includes a virtualized domain controller that is a copy of the source domain controller such that the virtualized domain controller includes the recovery agent. For example, recovery solution 201 could employ virtualization software 202 to create virtualized domain controller 301*a*.

Method 600 includes an act 603 of creating a command file that includes one or more commands for configuring the virtualized domain controller. For example, recovery solution 201 can create command file 401.

Method 600 includes an act 604 of employing the virtualization software to upload the command file to the known directory path on the virtualized domain controller to cause the recovery agent to identify the command file and execute the one or more commands to thereby configure the virtualized domain controller. For example, recovery solution 201 can employ virtualization software 202 to upload command file 401 to a known directory path on virtualized domain controller 301*a* where recovery agent 310 will detect the file and execute any commands in the file.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a recovery solution, for configuring a virtual machine to function as a virtualized domain controller in a virtualized Active Directory forest, the method comprising:
    prior to creating a virtualized Active Directory forest that represents a source Active Directory forest, installing a recovery agent on a source domain controller in the source Active Directory forest, the recovery agent being configured to scan a known directory path for command files and to execute any commands defined in the command files;
    employing virtualization software to create the virtualized Active Directory forest that includes a virtual machine that functions as a virtualized domain controller that is a copy of the source domain controller such that the virtualized domain controller includes the recovery agent;
    creating a command file that includes one or more commands for configuring the virtualized domain controller; and
    employing the virtualization software to upload the command file to the known directory path on the virtualized domain controller to cause the recovery agent to identify the command file and execute the one or more commands to thereby configure the virtualized domain controller.

2. The method of claim 1, wherein installing the recovery agent on the source domain controller comprises adding the recovery agent to a list of applications that are trusted by security software executing on the source domain controller.

3. The method of claim 1, wherein the one or more commands include a command for applying network settings on the virtualized domain controller.

4. The method of claim 1, wherein the one or more commands include a command for resetting passwords on the virtualized domain controller.

5. The method of claim 1, wherein the one or more commands include a command for assigning one or more roles to the virtualized domain controller.

6. The method of claim 5, wherein the one or more roles comprise a global catalog role.

7. The method of claim 5, wherein the one or more roles comprise one or more flexible single master operations roles.

8. The method of claim 1, wherein the source Active Directory forest includes a plurality of domain controllers, and wherein the recovery agent is installed on each of the plurality of domain controllers.

9. The method of claim 8, further comprising:
employing the virtualization software to create a virtualized domain controller in the virtualized Active Directory forest for each of the plurality of domain controllers;
creating a command file for each of the virtualized domain controllers that were created for the plurality of domain controllers; and
employing the virtualization software to upload the corresponding command file to the known directory path on the corresponding virtualized domain controller.

10. The method of claim 1, further comprising:
creating a second command file that includes one or more commands for configuring the virtualized domain controller; and
employing the virtualization software to upload the second command file to the known directory path on the virtualized domain controller.

11. The method of claim 1, further comprising:
employing the virtualization software to scan either the known directory path or another known directory path to identify any results file that the recovery agent has created to store results of executing the one or more commands.

12. One or more computer storage media storing computer executable instructions which implement a system for creating a virtualized Active Directory forest from a source Active Directory forest, the system comprising:
a recovery agent that is configured to be executed on a domain controller including to scan a known directory path for command files and to execute any command defined in the command files;
a recovery solution that is configured to perform the following steps to create the virtualized Active Directory forest from the source Active Directory forest:
install the recovery agent on source domain controllers in the source Active Directory forest;
employ virtualization software to create virtualized domain controllers in the virtualized Active Directory forest to represent the source domain controllers, the virtualized domain controllers being copies of the source domain controllers such that the recovery agent is installed on the virtualized domain controllers;
create a command file for each virtualized domain controller, each command file including one or more commands for configuring the corresponding virtualized domain controller; and
employ the virtualization software to upload each command file to the known directory path on the corresponding virtualized domain controller;
wherein, upon detecting the command file that has been uploaded to the known directory path on the corresponding virtualized domain controller, the recovery agent executes each of the one or more commands to configure the corresponding virtualized domain controller.

13. The one or more computer storage media of claim 12, wherein the recovery solution causes the recovery agent to be included in a list of applications trusted by security software executing on each source domain controller.

14. The one or more computer storage media of claim 12, wherein, after the recovery agent has executed the one or more commands, the recovery agent stores a results file containing results of the execution of the one or more commands in either the known directory path or another known directory path; and
wherein the recovery solution is configured to periodically scan either the known directory path or the other known directory path for results files such that the recovery solution will identify the results file stored by the recovery agent.

15. The one or more computer storage media of claim 12, wherein at least one of the command files includes commands for performing one or more of:
applying network settings on the corresponding virtualized domain controller;
resetting passwords on the corresponding virtualized domain controller; or
assigning one or more roles to the corresponding virtualized domain controller.

16. A method, performed by a recovery solution that includes a recovery agent, for configuring a virtualized domain controller, the method comprising:
installing, by the recovery solution, the recovery agent on a source domain controller in a source Active Directory forest;
instructing, by the recovery solution, virtualization software to create a virtualized domain controller as a copy of the source domain controller such that the virtualized domain controller includes the recovery agent;
uploading, by the recovery solution, a command file to a known directory path on the virtualized domain controller, the command file including one or more commands for configuring the virtualized domain controller;
periodically scanning, by the recovery agent, the known directory path; and
upon detecting the command file in the known directory path, executing, by the recovery agent, each of the one or more commands.

17. The method of claim 16, wherein installing the recovery agent includes adding the recovery agent as an application that is trusted by security software executing on the source domain controller.

18. The method of claim 16, wherein the recovery solution uploads the command file using one or more APIs provided by the virtualization software.

19. The method of claim 16, further comprising:
creating, by the recovery agent, a results file containing results of executing the one or more commands and storing the results file in either the known directory path or another known directory path; and
periodically scanning, by the recovery solution, either the known directory path or the other known directory path such that the recovery solution identifies and obtains the results file.

20. The method of claim 16, wherein the one or more commands cause the virtualized domain controller to perform a role that the source domain controller did not perform.

* * * * *